United States Patent [19]

Byon

[11] Patent Number: 5,775,783
[45] Date of Patent: Jul. 7, 1998

[54] ANTI-LOCK BRAKING SYSTEM CAPABLE OF RECORDING THE OPERATING CONDITIONS OF ELEMENTS THEREOF AND RECORDING METHOD THEREFOR

[75] Inventor: Sung-Kwang Byon, Seoul, Rep. of Korea

[73] Assignee: Daewoo Electronics Co., Ltd., Rep. of Korea

[21] Appl. No.: 686,102

[22] Filed: Jul. 24, 1996

[30] Foreign Application Priority Data

Jul. 28, 1995 [KR] Rep. of Korea ............... 1995-22708

[51] Int. Cl.$^6$ .................................................. B60T 8/32
[52] U.S. Cl. ...................... 303/122.08; 303/20; 303/122; 701/35; 701/71
[58] Field of Search ............... 303/122, 122.01–122.09; 364/424.04, 424.034, 424.038, 424.039; 346/7, 33 R, 33 D, 82; 73/489; 246/107, 123; 324/160; 340/438; 180/79.1; 395/183.22, 183.07; 701/35, 29, 34, 71

[56] References Cited

U.S. PATENT DOCUMENTS

| | | | |
|---|---|---|---|
| 4,067,061 | 1/1978 | Juhasz | 364/424.04 |
| 4,236,215 | 11/1980 | Callahan et al. | 364/424.04 |
| 4,497,057 | 1/1985 | Kato et al. | 395/183.22 |
| 4,561,057 | 12/1985 | Haley, Jr. et al. | 364/424.04 |
| 4,608,638 | 8/1986 | Tsikos | 364/424.04 |
| 4,638,289 | 1/1987 | Zottnik | 303/122.08 |
| 4,748,843 | 6/1988 | Schafer et al. | 364/424.04 |
| 4,853,859 | 8/1989 | Morita et al. | 364/424.04 |
| 5,005,129 | 4/1991 | Abe et al. | 364/424.036 |
| 5,034,889 | 7/1991 | Abe | 364/424.04 |
| 5,050,080 | 9/1991 | Abe | 364/424.04 |
| 5,065,321 | 11/1991 | Bezos et al. | 364/424.04 |
| 5,072,391 | 12/1991 | Abe | 364/424.04 |
| 5,325,082 | 6/1994 | Rodriguez | 364/424.04 |
| 5,416,708 | 5/1995 | Matsuto et al. | 364/426.02 |
| 5,430,432 | 7/1995 | Camhi et al. | 364/424.04 |
| 5,446,659 | 8/1995 | Yamawaki | 364/424.04 |
| 5,450,321 | 9/1995 | Crane | 364/424.04 |
| 5,477,141 | 12/1995 | Näther et al. | 364/424.04 |
| 5,500,797 | 3/1996 | Noger | 364/424.04 |
| 5,506,773 | 4/1996 | Takaba et al. | 364/424.04 |
| 5,541,840 | 7/1996 | Gurne et al. | 364/424.038 |
| 5,590,040 | 12/1996 | Abe et al. | 364/424.04 |

Primary Examiner—Douglas C. Butler

[57] ABSTRACT

An anti-lock braking system as well as the method thereof, is capable of recording the operating conditions of elements thereof. The anti-lock braking system includes a microcomputer having first and second memories. The method includes a step for resetting data stored in the second memory. A slip rate of a wheel, electric signals applied to both motor and a solenoid valve assembly, an output voltage and a RPM of the motor, an output pressure of a pump, and a pressure of a fluid passing through the solenoid valve assembly are permanetly recorded in the second memory. By using the anti-lock braking system, the user can easily find a malfunctioned element of the anti-lock braking system and can save the time and money normally used in checking the anti-lock braking system when the anti-lock braking system malfuntions.

7 Claims, 4 Drawing Sheets

ANTI-LOCK BRAKING SYSTEM CAPABLE OF RECORDING THE OPERATING CONDITIONS OF ELEMENTS THEREOF AND RECORDING METHOD THEREFOR

BACKGROUND OF THE INVENTION

1. Field of the Invention

The present invention relates to an anti-lock braking system, and more particularly to an anti-lock braking system capable of recording the operating conditions of elements thereof and a method for recording the operating conditions of elements of the anti-lock braking system.

1. Field of the Invention

Generally, an anti-lock braking system (ABS) is used for preventing the wheels of a vehicle from "locking" in the event of a sudden stop of the vehicle. The term "locking of the wheels" means that the rolling wheels of a vehicle are stopped by brake pressure applied to the wheels when a driver suddenly applies the brake while driving the vehicle.

When the wheels are subjected to this type of locking condition, the wheels may slip in the forward direction due to the inertia of the vehicle so that the frictional force between the wheels and the road surface may be reduced. For this reason, the braking distance may be longer and steering of the vehicle may be impossible, which can cause accidents.

In order to prevent these types of accidents, an anti-lock braking system is provided in the vehicle. The anti-lock braking system rapidly and repeatedly increases, maintains, and reduces brake pressure applied to the wheels in order to avoid the wheel locking, and thereby reduce accidents.

Generally, the ABS comprises a wheel speed sensor for sensing the RPM of the wheels, a control unit that generates a control signal according to a predetermined algorithm as the wheel speed is input from the wheel speed sensor, a motor that which operates a pump as the control signal is input from the control unit, and a valve system for adjusting fluid pressure applied to the wheels.

FIG. 4 shows a block diagram of a conventional ABS.

As shown in FIG. 4, conventional ABS 300 comprises a wheel speed sensor 310, which is attached to a wheel 360 in order to sense the speed of wheel 360 and send the speed data to an electric control unit(ECU). ECU 320 is connected to both a motor 330, which operates a pump 340 as an electric signal is input thereto from ECU 320, and a fluid pressure adjusting section 350, which intermittently transfers the pressurized fluid to wheel 360 according to the electric signal of ECU 320. Fluid pressure adjusting section 350 includes a solenoid valve assembly.

The conventional ABS 300 having the above structure operates as follows.

When a driver suddenly applies the brake, the speed of wheel 360 suddenly decreases. At this time, wheel speed sensor 310 senses the decreased speed of wheel 360 and sends the speed data to ECU 320. Upon receiving the speed data, ECU 320 calculates a slip rate. When the slip rate exceeds a predetermined threshold value, ECU 320 sends the electric signal to both motor 330 and fluid pressure adjusting section 350 to set the slip rate within the threshold value.

First ECU 320 sends a pressure-decrease signal to fluid pressure adjusting section 350. Upon receiving the pressure-decrease signal, fluid pressure adjusting section 350 blocks off a first fluid path disposed between wheel 360 and a master cylinder (not shown), and opens a second fluid path disposed between wheel 360 and a reservoir (not shown). As a result of that, the fluid pressure applied to wheel 360 is transferred to the reservoir through fluid pressure adjusting section 350, so that the fluid pressure applied to wheel 360 reduces. At the same time, pump 340 is operated by motor 330 as ECU 320 sends the electric signal to motor 330. Pump 340 transfers the oil filled in the reservoir to an accumulator (not shown).

Next, ECU 320 sends a pressure-maintenance signal to fluid pressure adjusting section 350. Upon receiving the pressure-maintenance signal, fluid pressure adjusting section 350 blocks off both first and second paths. Accordingly, the fluid pressure applied to wheel 360 is constantly maintained.

When it is required to increase fluid pressure, ECU 320 sends a pressure-increase signal to fluid pressure adjusting section 350. At this time, fluid pressure adjusting section 350 opens a third fluid path disposed between the accumulator and wheel 360. Therefore, the oil stored in the accumulator is transferred to wheel 360, so that the fluid pressure applied to wheel 360 increases.

Conventional ABS 300 rapidly repeats the above pressure-reduce, pressuremaintenance, and pressure-increase operations in a short period of time the prevent the wheels from locking even when the driver suddenly applies the brake.

However, the conventional ABS has a disadvantage. That is, when a traffic accident occurs due to a malfunction of the ABS, it is difficult for the user to find the element of the ABS that malfunctioned. For this reason, the user must check up or replace all elements of the ABS even if only one element has a fault, thereby wasting time and money.

On the other hand, U.S. Pat. No. 5,416,708 issued to Matsuto et al. shows a system for monitoring and controlling motor vehicle running condition. Matsuto's system has first and second CPUs for monitoring and controlling motor vehicle running conditions. In Matsuto's system, the first CPU determines whether a pressure modulator operates normally or not, and outputs a target angular displacement for a crank pin to the second CPU to provide an optimal braking force.

However, Matsuto's system does not disclose an apparatus for recording the operating conditions of elements of the pressure modulator. For this reason, the Matsuto's system does not find the malfunctioned element due to a malfunction of the ABS.

Accordingly, it is necessary to provide an ABS that records the operating conditions of elements thereof so that the user can rapidly find and replace a malfunctioned element when of the ABS malfunctions, thereby making the operation of the ABS reliable.

SUMMARY OF THE INVENTION

The present invention has been made to overcome the above described problems of the prior arts, and accordingly it is an object of the present invention to provide an ABS that records the operating conditions of elements thereof so that the user can rapidly find and replace a malfunctioned element when of the ABS malfuntions, thereby making the operation of the ABS reliable.

Another object of the present invention is to provide a method for recording the operating conditions of elements of the ABS.

To achieve the above objects, the present invention provides an anti-lock braking system capable of recording the operating conditions of elements thereof, the anti-lock braking system comprising:

a wheel speed sensor attached to a wheel of a vehicle for sensing a wheel speed and then generating a wheel speed signal;

an ABS ECU connected to the wheel speed sensor so as to receive the wheel speed signal from the wheel speed sensor, the ABS ECU calculating a slip rate based on the wheel speed signal and generating electric signals for controlling a fluid pressure applied to the wheel when the slip rate exceeds a predetermined normal value;

a motor section, which is driven as an electric signal is input from the ABS ECU;

a pump section for increasing a pressure of a fluid, the pump section being operated by the motor section;

a fluid pressure adjusting section for adjusting the fluid pressure applied to the wheel by intermittently transferring pressurized fluid to the wheel according to the electric signal from the ABS ECU; and a microcomputer for recording the operating conditions of the wheel speed sensor, the ABS ECU, the motor section, the pump section, and the fluid pressure adjusting section, respectively.

According to a preferred embodiment of the present invention, the microcomputer includes a first memory means for recording the operating conditions of the wheel speed sensor, the ABS ECU, the motor section, the pump section and the fluid pressure adjusting section respectively, and a second memory means for storing data recorded in the first memory means. The microcomputer is connected to an engine ECU determine whether the engine ECU is on or not. The microcomputer generates a reset signal for resetting the records stored in the second memory means when the engine ECU is turned on.

The fluid pressure adjusting section includes a solenoid valve assembly and a pressure sensor that senses the pressure of the fluid passing through the solenoid valve assembly and sends pressure data to the microcomputer. The solenoid valve assembly has a solenoid for receiving an intermittent electric signal from the ABS ECU, first and second piston valves that move forward and backward as the intermittent electric signal is applied to the solenoid, and a spring disposed between the first and second piston valves.

The motor section includes a motor driver connected to the ABS ECU so as to receive the electric signal from the ABS ECU, a motor connected to the motor driver in order to be driven as the electric signal is input to the motor driver, a voltage sensor for sensing an output voltage of the motor driver and then sending voltage data to the microcomputer, and an RPM sensor for sensing RPM of the motor and sending RPM data to the microcomputer.

The pump section includes a pump operated by the motor, and a pump pressure sensing means, which senses the pressure of the fluid at an outlet of the pump and then sends pressure data to the microcomputer.

The anti-lock braking system having the above structure operates as follows.

First, when the driver turns an ignition switch on, the microcomputer generates a reset signal to initialize the data stored the second memory portion.

As the vehicle is running, the ABS ECU calculates the slip rate of the wheel based on the wheel speed. The calculated slip rate is recorded in the first memory portion of the microcomputer. When the slip rate exceeds a predetermined normal range, the ABS ECU applies electric signals to both the pump section and the fluid pressure adjusting section in order to control the braking force. At this time, the microcomputer records data of the electric signals applied to both the pump section and the fluid pressure adjusting section in the first memory portion.

Next, the microcomputer records an output voltage of the motor driver and RPM of the motor in the first memory portion.

As the pump operates, the pump pressure sensing means installed at the outlet portion of the pump senses the oil pressure and sends pressure data to the microcomputer. The microcomputer records the pressure data in the first memory portion.

While pressure-reduce, pressure-maintenance, and pressure increase modes are performed, the pressure sensor of the fluid pressure adjusting section senses the pressure of the fluid passing through the solenoid valve assembly and sends pressure data to the microcomputer. The microcomputer records the pressure data in the first memory portion.

Then, the data recorded in the first memory portion are stored in the second memory portion.

After that, the microcomputer determines whether the engine ECU has been turned on or not. In the case that the engine ECU is still on, the above process may be repeated.

When the ABS malfunctions, the user can read the data stored in the second memory portion by using a diagnostic apparatus and can compare the recorded data with the predetermined data, the user thus can find the malfunctioned elements of the ABS.

As described above, the ABS according to the present invention can record the operating conditions of elements thereof while the ABS is operating, so that the user may easily and rapidly find the malfunctioned element of the ABS when the ABS malfunctions.

Further, since the user can find the malfunctioned element of the ABS, there is no need to check up or replace all elements of the ABS when the malfunction of ABS happens, thereby saving money and labor.

BRIEF DESCRIPTION OF THE DRAWINGS

The above objects and other advantages of the present invention will become more apparent by describing in detail the preferred embodiment thereof with reference to the attached drawings, in which.

DESCRIPTION OF THE PREFERRED EMBODIMENT

Hereinafter, the present invention will be described in detail with reference to the accompanying drawings.

Figure 1:
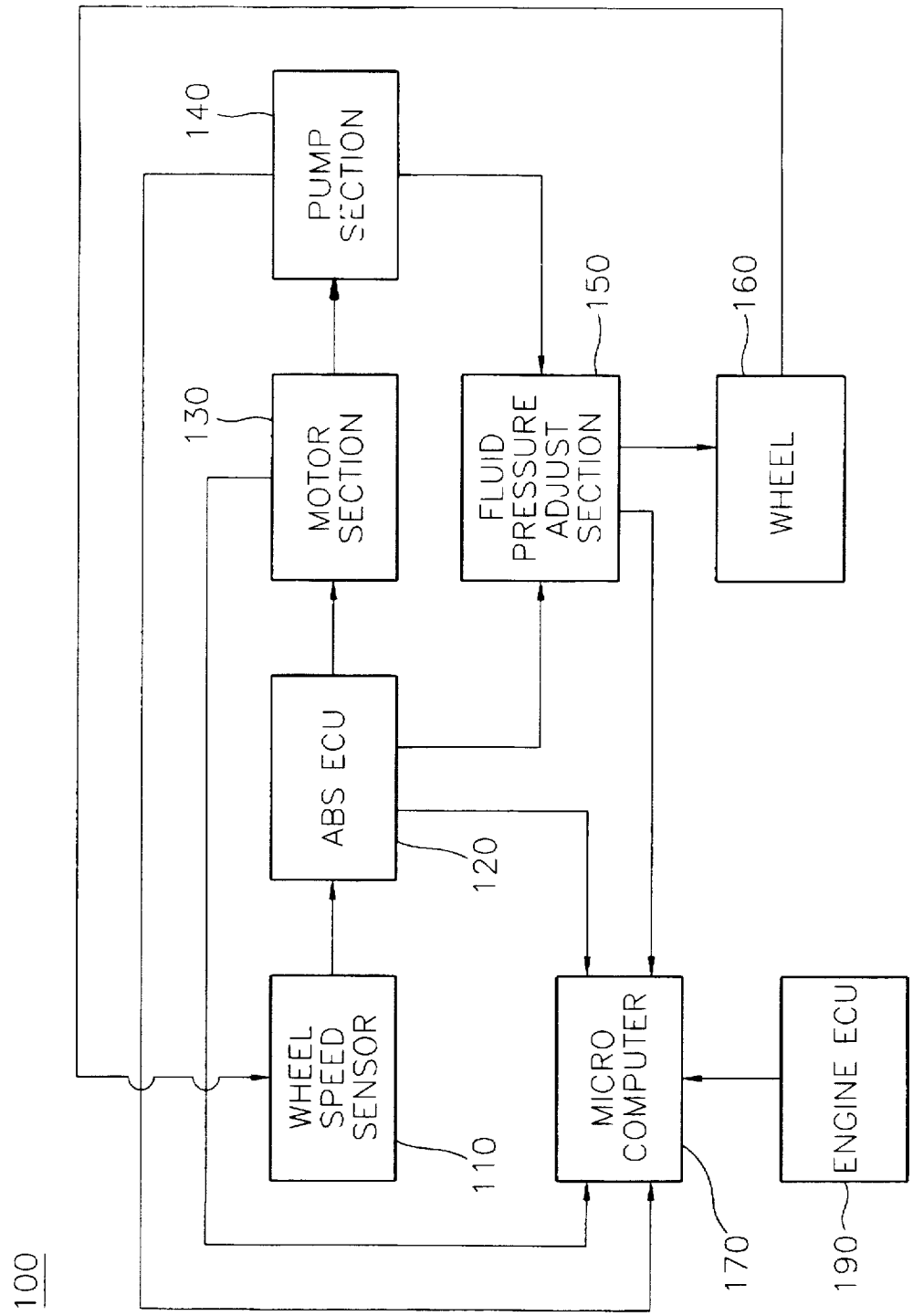
FIG. 1 is a block diagram of an ABS according to one embodiment of the present invention.

FIG. 1 shows a block diagram of an ABS according to one embodiment of the present invention.

As shown in FIG. 1, ABS 100 of the present invention includes a wheel speed sensor 110 attached to a wheel 100 of a vehicle for sensing the wheel speed and then generating a wheel speed signal, and an ABS ECU 120 connected to wheel speed sensor 110 so as to receive the wheel speed signal from wheel speed sensor 110. ABS ECU 120 calculates a slip rate based on the wheel speed and generates an electric signal for controlling braking pressure when the slip rate exceeds a predetermined normal value.

ABS ECU 120 is connected to both a motor section 130, which operates as the electric signal is input from ABS ECU 120 and a fluid pressure adjusting section 150, which adjusts braking pressure applied to wheel 100 by intermittently transferring the pressurized fluid to wheel 100 according to the electric signal from ABS ECU 120. Motor section 130 is connected to a pump section 140 in order to operate pump section 140 as the electric signal is input from ABS ECU 120.

In addition, ABS 100 of the present invention has a microcomputer 170. Microcomputer 170 is connected to ABS ECU 120, motor section 130, pump section 140 and fluid pressure adjusting section 150 respectively so as to record the operating conditions of the above elements. Microcomputer 170 is also connected to an engine ECU 190, so that microcomputer 170 may generate a reset signal for resetting the records therein when engine ECU 190 is turned on. Microcomputer 170 receives data regarding to the slip rate of wheel 100 from ABS ECU 120. As electric signals are applied to both motor section 130 and fluid pressure adjusting section 150 from ABS ECU 120, microcomputer 170 receives data of the electric signals from ABS ECU 120 and records them therein.

Figure 2:
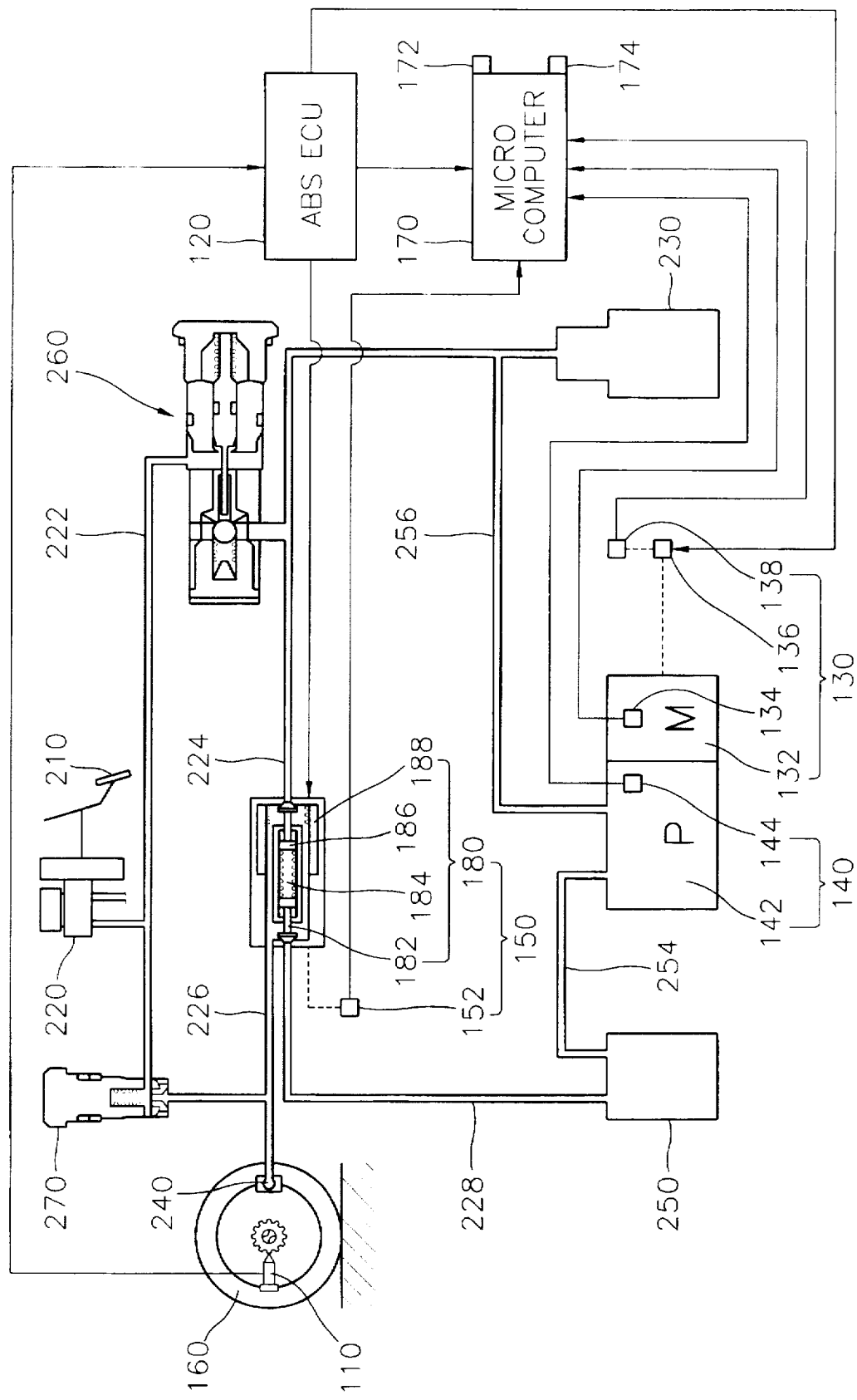
FIG. 2 is a circuit diagram of an ABS according to one embodiment of the present invention.

FIG. 2 shows a circuit diagram of ABS 100 having the above structure.

As shown in FIG. 2, microcomputer 170 includes a first memory portion 172 for recording the operating conditions of elements of ABS 100 and a second memory portion 174 for storing the data recorded in first memory portion 172. First memory portion records the operating conditions of wheel speed sensor 110, ABS ECU 120, motor section 130, pump section 140 and fluid pressure adjusting section 150, respectively. According to the preferred embodiment of the present invention, a RAM (random access memory) and an EEP-ROM (electrically erasable and programmable read only memory) are used as the first and second memory portions, respectively.

Motor section 130 includes a motor driver 136 for energizing a motor 132, a voltage sensor 138 that senses an output voltage of motor driver 136 and then sends voltage data to microcomputer 170, and an RPM sensor 134 accommodated in motor 132 in order to sense the RPM of motor 132 and then send RPM data to microcomputer 170.

Pump section 140 includes a pump 142 operated by motor 132, and a first pressure sensor 144 that senses oil pressure and then sends pressure data to microcomputer 170. First pressure sensor 144 is installed at an outlet portion of pump 142. Therefore, first pressure sensor 144 may sense oil pressure exhausted from pump 142. According to the preferred embodiment of the present invention, a pressure transducer is used as the first pressure sensor.

Fluid pressure adjusting section 150 includes a solenoid valve assembly 180, and a second pressure sensor 152 that senses the pressure of the oil passing through solenoid valve assembly 180 and then sends the pressure data to microcomputer 170. Solenoid valve assembly 180 comprises a solenoid 188, which receives an intermittent electric signal from ABS ECU 120, first and second piston valves 182 and 186, which move forward and backward as the intermittent electric signal is being applied to solenoid 188, and a spring 184 disposed between first and second piston valves 182 and 186.

On the other hand, a proportioning valve 260 is disposed between a master cylinder 220 and fluid pressure adjusting section 150. Proportioning valve 260 prevents the pressurized fluid in master cylinder 220 from flowing into wheel cylinder 240 when ABS 100 is operating.

Master cylinder 220 and proportioning valve 260 are communicated with each other through a first fluid path 222. In addition, proportioning valve 260 and fluid pressure adjusting section 150 are communicated with each other through a second fluid path 224. Fluid pressure adjusting section 150 is connected to both wheel cylinder 240 and a reservoir 250 through third and fourth fluid paths 226 and 228, respectively. Pump section 140 is connected to both reservoir 250 and an accumulator 230 through fifth and sixth fluid paths 254 and 256, respectively.

Reference number 270 is a check valve through which the pressurized fluid in wheel cylinder 240 returns to master cylinder 220 when the driver releases brake pedal 210.

Figure 3:
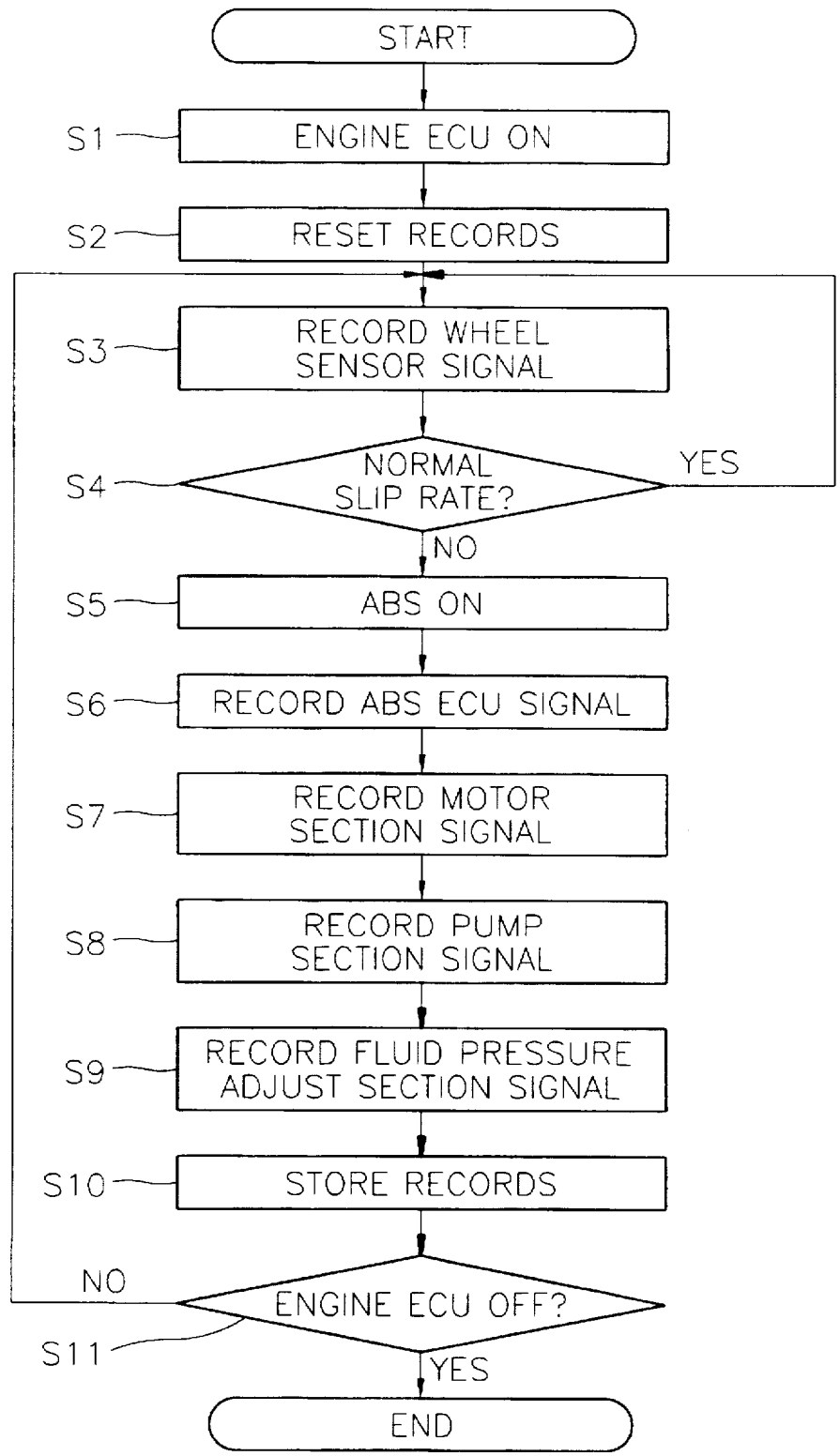
FIG. 3 is a flow chart showing a sequence for recording the operating conditions of elements of the ABS according to one embodiment of the present invention.
Figure 4:
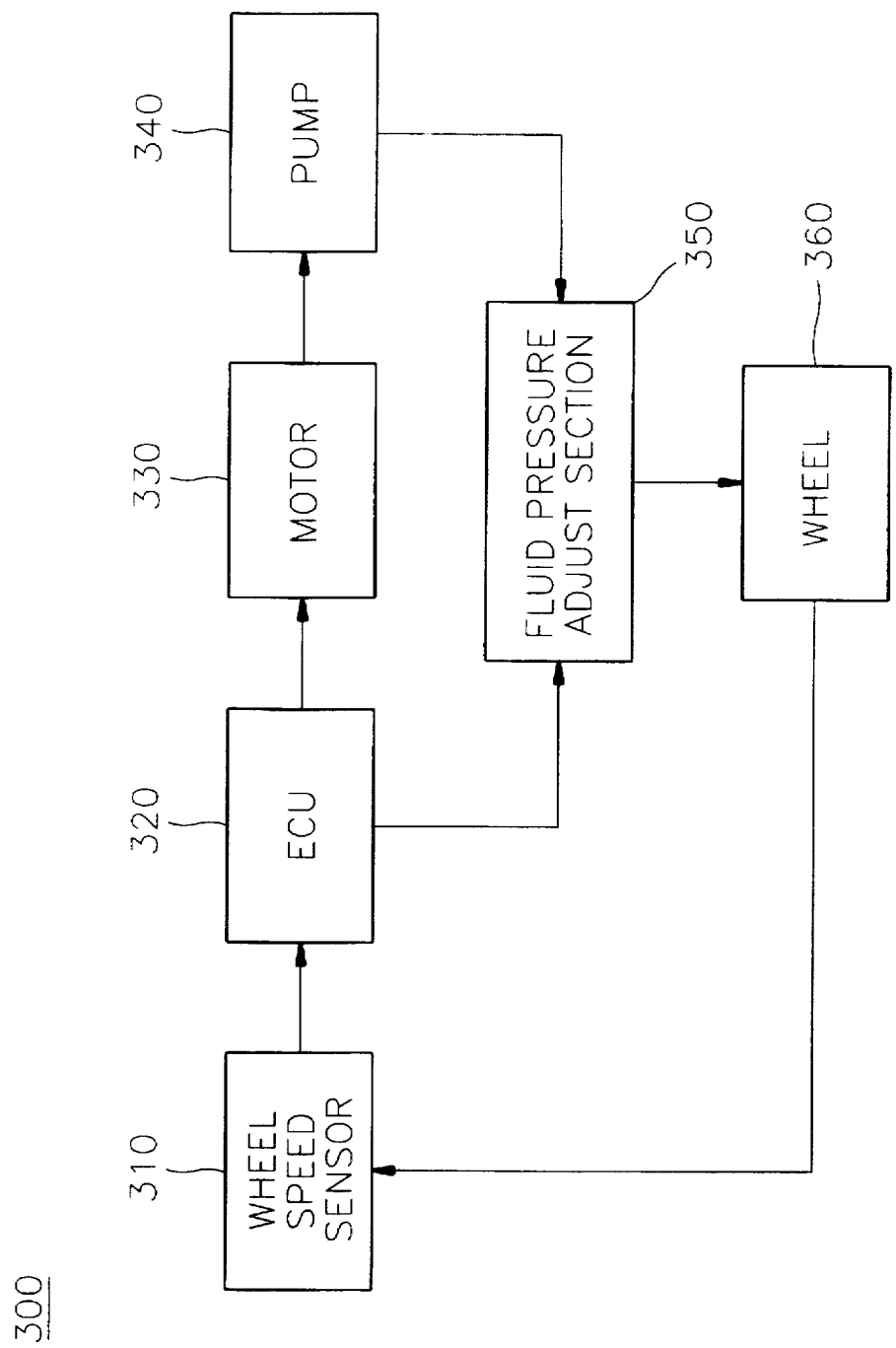
FIG. 4 is a block diagram of a conventional ABS.

FIG. 3 shows a flow chart representing a method for recording the operating condition of the ABS having the above structure. Hereinafter, the operation of ABS 100 will be described with reference to the FIG. 3.

First, when the driver turns an ignition switch (not shown) on, engine ECU 190 connected to the ignition switch operates (step S1). At this time, engine ECU 190 interconnected to microcomputer 170 sends an operating signal to microcomputer 170. Upon receiving the operating signal from engine ECU 190, microcomputer 170 generates a reset signal to initialize the data stored in second memory portion 174 (step S2).

As the vehicle is running, wheel speed sensor 110 sends wheel speed data to ABS ECU 120. ABS ECU 120 calculates the slip rate of wheel 100 based on the wheel speed, and sends the calculated slip rate to first memory portion 172 of microcomputer 170 (step S3). At the same time, ABS ECU 120 determines whether or not the slip rate exceeds a predetermined normal range (step S4). When the slip rate exceeds the predetermined normal range, ABS ECU 120 applies electric signals to both pump section 140 and fluid pressure adjusting section 150 in order to control the braking force (step S5). At this time, microcomputer 170 records data of the electric signals applied to both pump section 140 and fluid pressure adjusting section 150 in first memory portion 172 (step S6).

In order to control the braking force applied to wheel 100, ABS ECU 120 first sends a pressure-reduce signal to solenoid valve assembly 180 of fluid pressure adjusting section 150. As the pressure-reduce signal is applied to solenoid valve assembly 180, an electric signal is applied to solenoid 188 so that solenoid 188 is magnetized. Accordingly, first piston valve 182 moves towards solenoid 188 by the magnetic force of solenoid 188, while overcoming the bias force of spring 184. As a result, the pressurized fluid applied to wheel 100 is transferred to reservoir 250 through third and fourth fluid paths 226 and 228, thereby reducing the braking force applied to wheel 100.

At the same time, as the electric signal is applied to motor section 130, motor driver 136 energizes motor 132, so that pump 142 may operate. At this time, voltage sensor 138 of motor section 130 senses the output voltage of motor driver 136 and sends voltage data to first memory portion 172 of microcomputer 170 (step S7). In step S7, RPM sensor 134 also senses RPM of motor 132 and sends RPM data to first memory portion 172 of microcomputer 170.

As pump 142 operates, oil stored in reservoir 250 is introduced to accumulator 230 by way of fifth fluid path 254.

pump 142 and sixth fluid path 256. While passing through pump 142, pressure of the oil is increased by pump 142 so that the oil having increased pressure is stored in accumulator 230. When the oil moves from pump 142 to sixth fluid path 256, first pressure sensor 144 installed at the outlet portion of pump 142 senses the oil pressure and sends the pressure data to microcomputer 170. Microcomputer 170 records the pressure data in first memory portion 172 (step S8).

Next, ABS ECU 120 sends a pressure-maintenance signal to fluid pressure adjusting section 150. As the pressure-maintenance signal is applied to fluid pressure adjusting section 150, the electric signal being applied to solenoid 188 is cut-off, so that first piston valve 182 moves to its initial position by the bias force of spring 184 and thereby blocks off fourth fluid path 228. In addition, second piston valve 186 blocks off second fluid path 224. As a result, the braking force applied to wheel 100 is constantly maintained.

When an increase in the braking force is required, ABS ECU 120 sends a pressure-increase signal to fluid pressure adjusting section 150. Upon receiving the pressure-increase signal, second piston valve 186 of fluid pressure adjusting section 150 opens second fluid path 224. As a result, the high-pressure oil stored in accumulator 230 is transferred to wheel cylinder 240 by way of second fluid path 224, fluid pressure adjusting section 150, and third fluid path 226, so that the braking force applied to wheel 100 increases.

While the pressure-reduce, pressure-maintenance, and pressure increase modes are performed, second pressure sensor 152 senses the pressure of the fluid passing through solenoid valve assembly 180 and sends pressure data to microcomputer 170. Microcomputer 170 records the pressure data in first memory portion 172 (step S9).

When steps Si through S9 are executed once, the data recorded in first memory portion 172 are stored in second memory portion 174 (step S10). After the step S10 has finished, microcomputer 170 determines whether engine ECU 190 has turned off or not. In the case when engine ECU 190 is still on, steps S3 through S9 may be repeated.

When the ABS 100 malfunctions, the user can read the data stored in second memory portion 174 by using a diagnostic apparatus and can compare the recorded data with the predetermined data, thereby the user can find the malfunctioned elements of ABS 100.

As described above, the ABS according to the present invention can record the operating conditions of elements thereof while the ABS operates, so the user may easily and rapidly find the malfunctioned element of the ABS when the ABS malfunctions.

Further, since the user can find the malfunctioned element of the ABS, there is no need to check up or replace all elements of the ABS when the malfunction of the ABS happens, thereby saving money and labor.

While the present invention has been particularly shown and described with reference to the preferred embodiment thereof, it will be understood by those skilled in the art that various changes in form and detail may be effected therein without departing from the spirit and scope of the invention as defined by the appended claims.

What is claimed is:

1. An anti-lock braking system capable of recording operating conditions of elements thereof, comprising:
 a wheel speed sensor attached to a wheel of a vehicle for sensing a wheel speed and generating a wheel speed signal;
 an ABS ECU connected to the wheel speed sensor so as to receive the wheel speed signal from the wheel speed sensor, the ABS ECU calculating a slip rate based on the wheel speed signal and generating electric signals for controlling fluid pressure applied to the wheel when the slip rate exceeds a predetermined normal value;
 a motor section, which is driven as the electric signal is input thereto by the ABS ECU;
 a pump section for increasing pressure of fluid, the pump section being operated by the motor section;
 a fluid pressure adjusting section for adjusting the fluid pressure applied to the wheel by intermittently transferring pressurized fluid to the wheel according to the electric signal from the ABS ECU; and
 a microcomputer for recording the operating conditions of the wheel speed sensor, the ABS ECU, the motor section, the pump section, and the fluid pressure adjusting section, respectively,
 wherein the microcomputer includes a first memory means comprising a random access memory for recording the operating conditions of the wheel speed sensor, the ABS ECU, the motor section, the pump section, and the fluid pressure adjusting section, respectively, and a second memory means comprised of an electrically erasable and programmable read only memory for storing data recorded in the first memory means,
 wherein the microcomputer is connected to an engine ECU to determine whether the engine ECU has been turned on or not, the microcomputer generating a reset signal for resetting the records stored in the second memory means when the engine ECU is turned on,
 wherein the microcomputer is connected to the ABS ECU to receive wheel-sliP rate data and the electric signals applied to both the motor section and the fluid pressure adjusting section from the ABS ECU, the microcomputer storing the data in the first memory means into the second memory means when the wheel-slip rate exceeds the predetermined normal value.

2. The anti-lock braking system as claimed in claim 1, wherein the fluid pressure adjusting section includes a solenoid valve assembly and a pressure sensors, which senses the pressure of the fluid passing through the solenoid valve assembly and sends pressure data to the microcomputer, the solenoid valve assembly having a solenoid for receiving an intermittent electric signal from the ABS ECU, first and second piston valves, which move forward and backward as the intermittent electric signal is applied to the solenoid, and a spring disposed between the first and second piston valves, the microcomputer being connected to the pressure sensor to record the pressure data to the first memory means.

3. The anti-lock braking system as claimed in claim 1, wherein the motor section includes a motor driver connected to the ABS ECU so as to receive the electric signal from the ABS ECU, a motor connected to the motor driver and driven as the electric signal is input to the motor driver, and a voltage sensor for sensing an output voltage of the motor driver and sending voltage data to the microcomputer, wherein the motor driver energizes the motor and the microcomputer is connected to the voltage sensor to record the voltage data to the first memory means.

4. The anti-lock braking system as claimed in claim 3, wherein the motor section further includes an RPM sensor for sensing RPM of the motor and sending RPM data to the microcomputer, the microcomputer being connected to the RPM sensor to record the RPM data to the first memory means.

5. The anti-lock braking system as claimed in claim 3, wherein the pump section includes a pump operated by the motor, and a pump pressure sensing means, which senses the pressure of the fluid at an outlet of the pump and sends pressure data to the microcomputer, wherein the microcomputer is connected to the pump pressure sensing means to record the pressure data to the first memory means.

6. The anti-lock braking system as claimed in claim 5, wherein the pump pressure sensing means includes a pressure transducer.

7. An anti-lock braking system capable of recording operating conditions of elements thereof, comprising:

a wheel speed sensor attached to a wheel of a vehicle for sensing a wheel speed and generating a wheel speed signal;

an ABS ECU connected to the wheel speed sensor so as to receive the wheel speed signal from the wheel speed sensor, the ABS ECU calculating a slip rate based on the wheel speed signal and generating electric signals for controlling fluid pressure applied to the wheel when the slip rate exceeds a predetermined normal value;

a motor section, which is driven as the electric signal is input from the ABS ECU, the motor section including a motor driver connected to the ABS ECU so as to receive the electric signal from the ABS ECU, a motor connected to the motor driver and driven as the electric signal is input to the motor driver, a voltage sensor for sensing an output voltage of the motor driver, and an RPM sensor for sensing RPM of the motor;

a pump section for increasing pressure of fluid, the pump section including a pump operated by the motor and a pressure transducer for sensing the pressure of the fluid at an outlet of the pump;

a fluid pressure adjusting section for adjusting the fluid pressure applied to the wheel by intermittently transferring a pressurized fluid to the wheel according to the electric signal from the ABS ECU, the fluid pressure adjusting section including a solenoid valve assembly connected to the ABS ECU and a pressure sensor for sensing the pressure of the fluid passing through the solenoid valve assembly, the solenoid valve assembly including a solenoid for receiving an intermittent electric signal from the ABS ECU, first and second piston valves, which move forward and backward as the intermittent electric signal is applied to the solenoid, and a spring disposed between the first and second piston valves; and a microcomputer having a random access memory for recording the operating conditions of the wheel speed sensor, of the ABS ECU, of the motor section, of the pump section, and of the fluid pressure adjusting section respectively, and an electrically erasable and programmable read only memory for storing data recorded in the random access memory, wherein the microcomputer is connected to:

an engine ECU to determine whether the engine ECU has been turned on or not, the microcomputer generating a reset signal for resetting the data stored in the electrically erasable and programmable memory when the engine ECU is turned on, the ABS ECU to receive and record data regarding the slip rate of the wheel and the electric signals applied to both the motor section and the fluid pressure adjusting section from the ABS ECU, the pressure sensor of the fluid pressure adjusting section to record the pressure of the fluid to the random access memory, the voltage sensor of the motor section to record voltage data to the random access memory, the RPM sensor of the motor section record RPM data to the random access memory, and the pressure transducer to record pump pressure data to the random access memory, wherein the microcomputer stores the data in the first memory means into the second memory means when the slip rate exceeds the predetermined normal value.

* * * * *